(12) United States Patent
Tomaru

(10) Patent No.: US 7,738,793 B2
(45) Date of Patent: Jun. 15, 2010

(54) SECURE OPTICAL COMMUNICATION SYSTEM

(75) Inventor: Tatsuya Tomaru, Hatoyama (JP)

(73) Assignee: Hitachi, Ltd., Tokyo (JP)

(*) Notice: Subject to any disclaimer, the term of this patent is extended or adjusted under 35 U.S.C. 154(b) by 562 days.

(21) Appl. No.: 11/589,222

(22) Filed: Oct. 30, 2006

(65) Prior Publication Data

US 2008/0031637 A1 Feb. 7, 2008

(30) Foreign Application Priority Data

Nov. 2, 2005 (JP) ............................. 2005-319032

(51) Int. Cl.
  *H04B 10/00* (2006.01)
  *H04B 10/12* (2006.01)
  *H04L 9/00* (2006.01)
(52) U.S. Cl. .................. 398/156; 398/188; 398/140; 398/201; 398/158; 380/46
(58) Field of Classification Search .............. 398/188, 398/203, 207, 212; 380/256, 262
  See application file for complete search history.

(56) References Cited

U.S. PATENT DOCUMENTS

| | | | |
|---|---|---|---|
| 4,951,286 A * | 8/1990 | Kimble et al. ............... 372/21 |
| 5,113,524 A * | 5/1992 | Hirota et al. ................ 398/43 |
| 5,339,182 A * | 8/1994 | Kimble et al. ............. 398/158 |
| 2004/0062555 A1* | 4/2004 | Minato et al. ............. 398/201 |
| 2005/0157875 A1* | 7/2005 | Nishioka et al. ............ 380/46 |
| 2006/0018594 A1* | 1/2006 | Sugitatsu et al. ............ 385/27 |
| 2006/0050625 A1* | 3/2006 | Krasner .................... 370/208 |
| 2006/0263096 A1* | 11/2006 | Dinu et al. ................ 398/187 |

FOREIGN PATENT DOCUMENTS

JP 08211429 A * 8/1996

OTHER PUBLICATIONS

Leonhardt, "High Accuracy Optical Homodyne Detection With Low Efficiency Detectors:Preamplification From Antisqueezing", Physical Review Letters, Jun. 27, 1994.*
Leonhardt ["High Accuracy Optical Homodyne Detection With Low Efficiency Detectors: Preamplification From Antisqueezing", Physical review letters, vol. 72, Jun. 27, 1994, pp. 4086-4089].*

(Continued)

*Primary Examiner*—Ken N Vanderpuye
*Assistant Examiner*—Oomen Jacob
(74) *Attorney, Agent, or Firm*—Stites & Harbison PLLC; Juan Carlos A. Marquez, Esq.

(57) ABSTRACT

For conventional cipher communications based on the principles of quantum mechanics, the photon number per signal needs to be controlled below 1 or to a mesoscopic level in order to make quantum-mechanical properties remarkable. This invention is intended to provide a quantum-mechanical communications' method that is practical even with a macroscopic number of photons. Antisqueezed light is transmitted using a random sender basis. The legitimate recipient can use a secret key to know the random sender basis, and thus to receive the information accurately without being affected by antisqueezing. However, because eavesdroppers unknowing of the sender basis must use haphazard bases in an attempt to receive the signals, the eavesdroppers are significantly affected by antisqueezing and the respective signal bit-error-rates are increased. This makes eavesdropping impossible, thus ensuring secure communications between the legitimate senders and recipients.

8 Claims, 13 Drawing Sheets

OTHER PUBLICATIONS

Leonhardt ["High Accuracy Optical Homodyne Detection with Low Efficiency Detectors: Preamplification from Antisqueezing", Physical review letters, vol. 72, Jun. 27, 1994, pp. 4086-4089].*

Barbosa, Geraldo et al., "Secure Communication Using Mesoscopic Coherent States", Physical Review Letters, vol. 90, No. 22, Jun. 6, 2003, pp. 227901-1-4.

Gisin, Nicholas et al., "Quantum cryptography", Reviews of Modern Physics, vol. 74, Jan. 2002, pp. 145-195.

Nishioka, Tsuyoshi et al., "How much security does Y-00 protocol provide us?", arXiv: quant-ph/0310168, vol. 2, Oct. 31, 2003, pp. 1-4.

* cited by examiner

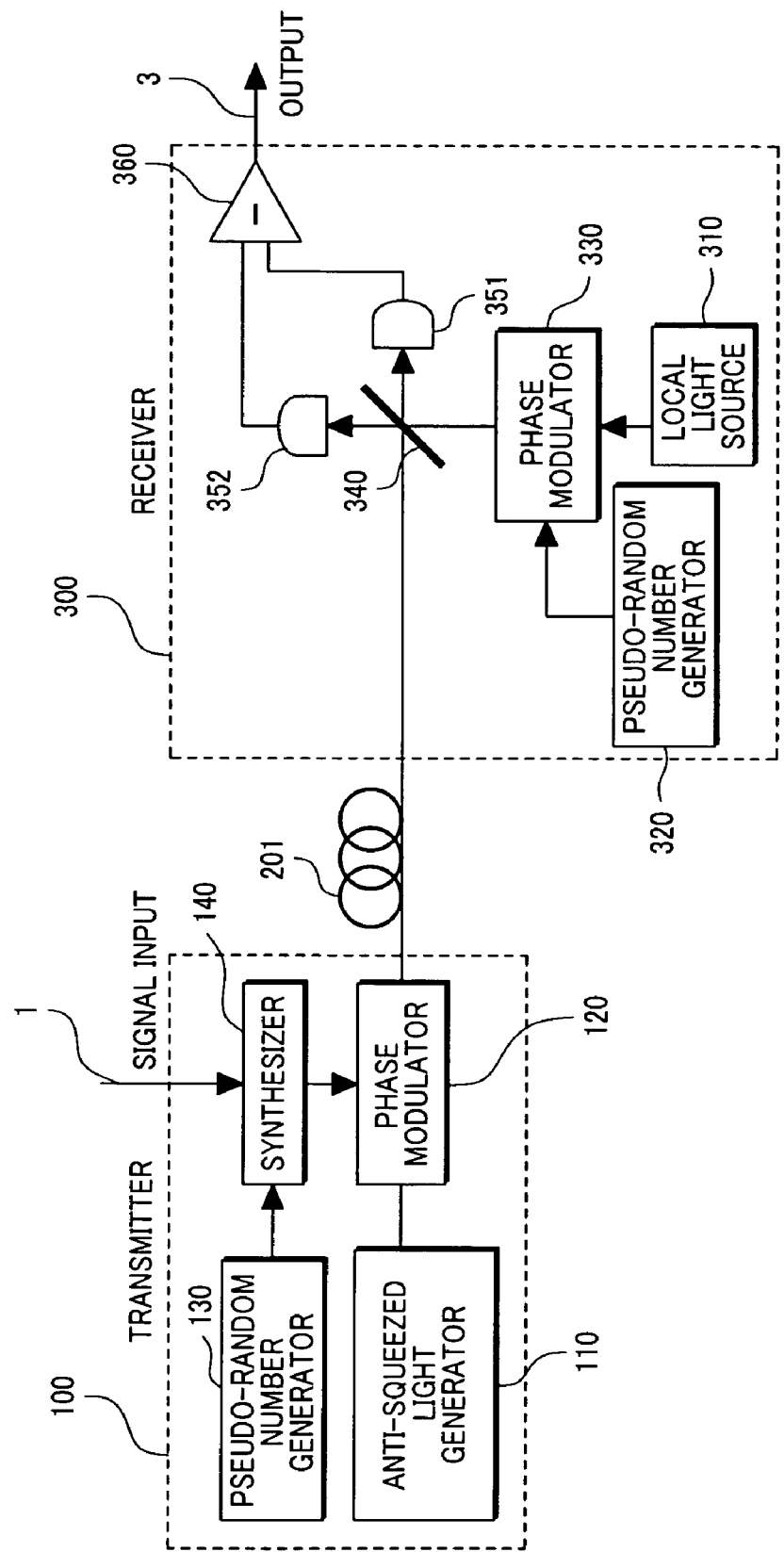

FIG.10

| | TRANSMITTER | | | | RECEIVER | | |
|---|---|---|---|---|---|---|---|
| SLOT t | PSEUDO-RANDOM NUMBER φ(t) | SIGNAL s(t) | SYNTHESIZED SIGNAL φ(t)+s(t) | OUTPUT SIGNAL $\sum_{t=0}^{t}[\phi(t)+s(t)]$ | SLOT | DETECTED SIGNAL WHEN THE RECEIVER USES ZERO PHASE | PSEUDO-RANDOM NUMBER | DETECTED SIGNAL WHEN THE RECEIVER USES PSEUDO-RANDOM NUMBERS |
| 0 | 0.11π | 0 | 0.11π | 0.11π | | | | |
| 1 | 1.37π | 0 | 1.37π | 1.48π | 1 | 1.37π | 1.37π | 0 |
| 2 | 1.92π | π | 0.92π | 0.40π | 2 | 0.92π | 1.92π | π |
| 3 | 0.50π | π | 1.50π | 1.90π | 3 | 1.50π | 0.50π | π |
| 4 | 0.78π | 0 | 0.78π | 0.68π | 4 | 0.78π | 0.78π | 0 |
| . | . | . | . | . | . | . | . | . |
| . | . | . | . | . | . | . | . | . |
| . | . | . | . | . | . | . | . | . |

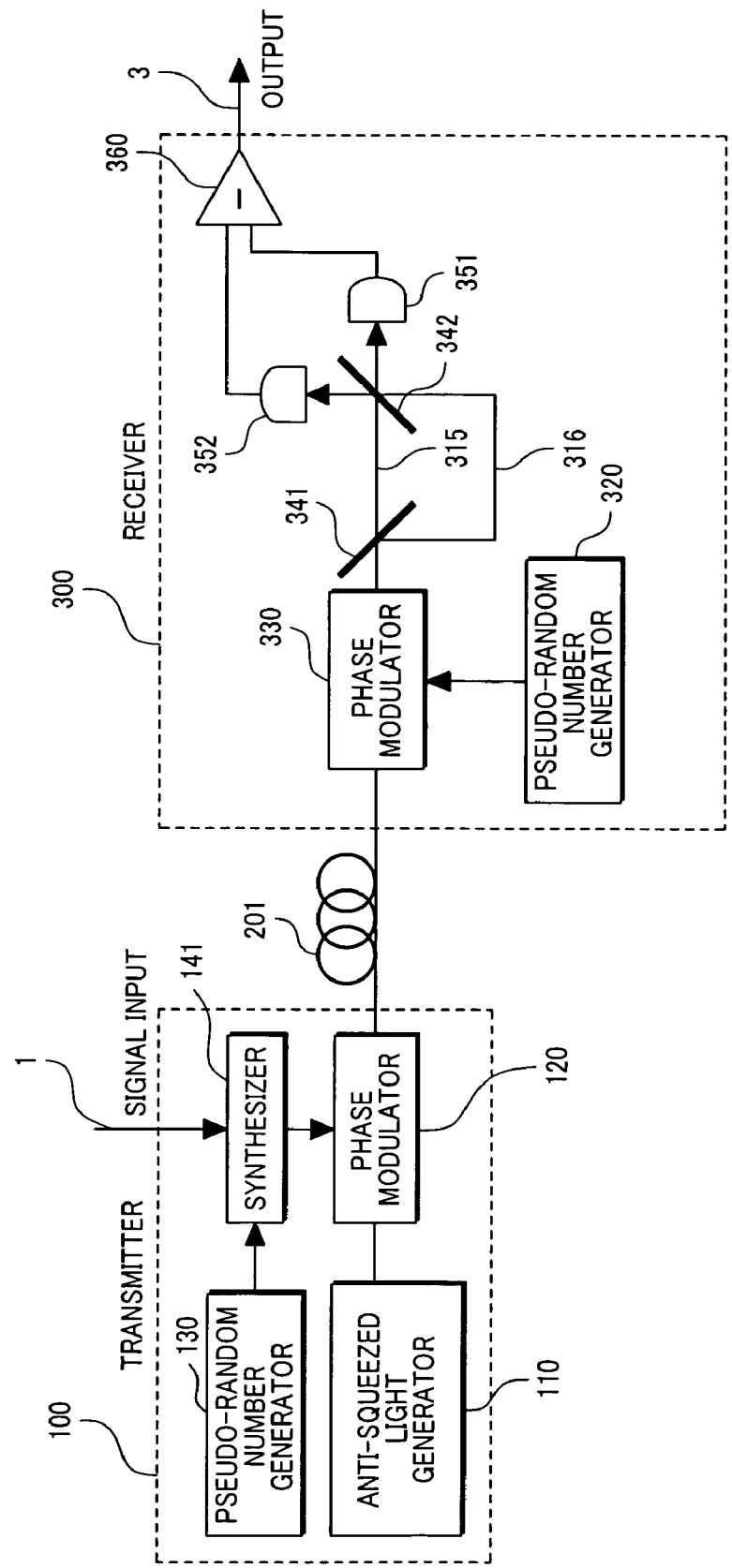

FIG.12

| TRANSMITTER | | | | RECEIVER | | | |
|---|---|---|---|---|---|---|---|
| SLOT t | PSEUDO-RANDOM NUMBER $\phi(t)$ | SIGNAL $s(t)$ | OUTPUT SIGNAL $\sum_{t=0}^{t} s(t) + \phi(t)$ | SLOT | DETECTED SIGNAL WHEN THE RECEIVER USES ZERO PHASE | PSEUDO-RANDOM NUMBER $\phi(t)$ | INPUT SIGNAL FROM WHICH THE PSEUDO-RANDOM NUMBER IS SUBTRACTED | DETECTED SIGNAL WHEN THE RECEIVER USES PSEUDO-RANDOM NUMBERS |
| 0 | $0.11\pi$ | 0 | $0.11\pi$ | | | $0.11\pi$ | 0 | 0 |
| 1 | $1.37\pi$ | 0 | $1.37\pi$ | 1 | $1.26\pi$ | $1.37\pi$ | 0 | 0 |
| 2 | $1.92\pi$ | $\pi$ | $0.92\pi$ | 2 | $1.55\pi$ | $1.92\pi$ | $\pi$ | $\pi$ |
| 3 | $0.50\pi$ | $\pi$ | $0.50\pi$ | 3 | $1.58\pi$ | $0.50\pi$ | 0 | $\pi$ |
| 4 | $0.78\pi$ | 0 | $0.78\pi$ | 4 | $0.28\pi$ | $0.78\pi$ | 0 | 0 |
| . | . | . | . | . | . | . | . | . |
| . | . | . | . | . | . | . | . | . | ure Optical Communication System

SECURE OPTICAL COMMUNICATION SYSTEM

CLAIM OF PRIORITY

The present application claims priority from Japanese application JP 2005-319032 filed on Nov. 2, 2005, the content of which is hereby incorporated by reference into this application.

FIELD OF THE INVENTION

The present invention relates to quantum communications, quantum cryptography, and optical communications.

BACKGROUND OF THE INVENTION

The need for secrecy in communications is an everlasting theme extending from ancient times to the future, and in the recent network society, the particular need has been ensured by the advancement of cryptography. The security of the currently widely used public key cryptosystem and the like depends on the fact that an unrealistic time is required for decoding. However, because computer technology is continuing to make constant progress, the above does not mean that the security of the public key cryptosystem and the like is guaranteed over the future. In contrast, quantum cryptography on which active researches are currently being done has its security guaranteed by the laws of physics, and no matter how far technology progresses, the security of quantum cryptography will not deteriorate. The realization thereof is being hoped for in this context.

The quantum cryptography, currently closest to practical use, is the quantum key distribution scheme using faint LD light, described in Non-Patent Document 1. This scheme utilizes the laws of quantum mechanics to share a necessary common key between a message sender and a recipient, and perform encrypted normal communications after the common key has been shared. During the process of sharing the common key, a random-number signal is transmitted using an exclusive optical line with the average photon number of less than one for one signal. Because one signal is constructed using less than one photon of light, even if this signal is eavesdropped on, the legitimate recipient can detect this fact and generate the common key by using only the random-number data whose successful receiving without being eavesdropped on has been ascertainable. Although the security of this scheme is already proved in cryptographic terms, the scheme always requires an exclusive line and is extremely weak against transmission loss because the number of photons used for one signal is less than one. For instance, 100-km transmission reduces the generating rate of the key to about several bits per second (bps). These drawbacks suggest that the introduction of the quantum key distribution scheme which uses faint LD light will be confined to limited use.

Under the background, Yuen et al. have proposed (in Non-Patent Document 2) a quantum-mechanical scheme that uses a mesoscopic number of photons to transmit the signal itself as well as to deliver a key ("mesoscopic" is a term that means somewhere in between "macroscopic" and "microscopic"). The two quadrature components (or paired intensity and phase) of light are not determined simultaneously below the accuracy of its quantum-mechanical fluctuation. Changing a transmission basis finely in a phase modulation scheme and ensuring that adjacent transmission bases are included in the range of quantum-mechanical fluctuation makes it impossible for eavesdroppers unknowing of these transmission bases to retrieve meaningful information from eavesdropping signals. It is reported in Non-Patent Document 3, however, that in this scheme, although the bases assuredly become uncertain within the range of quantum-mechanical fluctuation, if the pseudo-random numbers, which are used in ordinary encryption, are used during the process of changing the basis, when the photon number per signal is increased, the security of the scheme will be no more than that of ordinary classical mechanics-based encryption. In the present situation, the quantum-mechanical scheme mentioned above is still at its research phase.

Although the photon number in the method by Yuen et al. is limited to a mesoscopic number, this method has departed from using less than one photon of faint light and been invented in view not only of distributing a key, but also of sending the signal itself. Hence, the above method is an invention that has approached a realistic position. [Non-Patent Document 1] N. Gisin, G. Ribordy, W. Tittel, and H. Zbinden, Reviews of Modern Physics 74, 145-195 (2002).
[Non-Patent Document 2] G. A. Barbosa, E. Corndorf, P. Kumar, and H. Yuen, Physical Review Letters 90, No. 22, 227901 (2003).
[Non-Patent Document 3] T. Nishioka, T. Hasegawa, H. Ishizuka, K. Imafuku, and H. Imai, arXiv: quant-ph/0310168 v2 31 Oct. 2003 (http://xxx.lanl.gov/).

SUMMARY OF THE INVENTION

In applying a quantum-mechanical technique to a communications' method, at present, a transmission system must be constructed with faint light or a mesoscopic amount of light because of many restrictions being present as discussed in "Background Art". It is therefore difficult to apply a quantum-mechanical technique to an actual general optical communications' system. From a realistic standpoint, it is desirable that a sufficiently macroscopic number of photons be usable and that amplification be possible. It is an object of the present invention to provide a quantum-mechanical communications' method that satisfies these two requirements.

Quantum-mechanical states are generally fragile. For example, partial loss of light on a transmission path theoretically brings a quantum-mechanical vacuum fluctuation to flow into the quantum state, depending on the amount of loss.

Squeezed states are typical quantum-mechanical states. A coherent-state fluctuation of output light from a laser has the same magnitude as that of a vacuum fluctuation, and two quadrature components are equal in fluctuation. A squeezed state is generated by reducing the fluctuation of one of the two quadrature components and expanding the fluctuation of the other quadrature component. If a portion of the squeezed state is lost, the quadrature component whose fluctuation has been reduced will be easily returned to a level as high as a vacuum fluctuation level (coherent-state fluctuation) by the inflow of the vacuum fluctuation. This is why the quantum communication using a squeezed state is difficult. However, for the component whose fluctuation has been expanded in a squeezed state (i.e., an antisqueezed component), even if the vacuum fluctuation is added by partial loss of the light, the basic characteristics of the fluctuation will be determined by an original antisqueezed component whose fluctuation has been expanded. The fluctuation will not easily return to a level as low as the coherent-state level (i.e., the vacuum fluctuation level) although correspondingly reduced as a result. In other words, the antisqueezed component is as loss-resistant as ordinary classical optical communications.

In the present invention, therefore, a communications' method using an antisqueezed component is disclosed here-under. The signal applied is binary, and an axis equivalent to a basis is selected at random in a phase space. Plus and minus directions of the basis axis correspond to the two values of the binary signal, and an antisqueezing direction is perpendicular to the basis axis. The present invention is based on the assumption that the legitimate recipient can know the randomness of the basis axis. Because of the presence of this prerequisite, the randomness of the basis axis never makes it difficult for the legitimate recipient to receive the signal, and the signal-to-noise (S/N) ratio does not deteriorate because the superimposing direction of the signal is perpendicular to the antisqueezing direction. Conversely, even if an eavesdropper is present, unless the eavesdropper possesses information on the randomness of the basis axis, the S/N ratio will deteriorate significantly and eavesdropping will be de facto impossible, because the eavesdropper will detect a signal inclusive of the significant fluctuation of antisqueezing.

Antisqueezing does not bring about the deterioration of the S/N ratio for the legitimate recipient who knows the direction of antisqueezing and causes the deterioration of the S/N ratio for eavesdroppers unknowing of the direction, thus preventing a meaningful information volume from being delivered to the eavesdroppers. Increases in signal intensity increase the S/N ratio for both the legitimate recipient and the eavesdroppers. To prevent eavesdropping, however, it is preferable that the S/N ratio be smaller for eavesdroppers. Reduction in the S/N ratio can be attained by enhancing antisqueezing according to the particular signal intensity.

The present invention makes it possible to realize a quantum-mechanical communications' method on which no such limitations as using a mesoscopic number of photons are imposed, and which can be applied even with such a macroscopic photon number as used in ordinary optical communications. Hence, the communications' method, whose security is guaranteed by the laws of physics, becomes possible, even against macroscopic signal intensity.

BRIEF DESCRIPTION OF THE DRAWINGS

FIG. 1 is a block diagram that shows a configuration for carrying out the present invention in principle;

FIG. 10 is a diagram that shows flows of phase signals from a transmitter to a receiver in DPSK using the configuration of FIG. 9;

FIG. 11 is a block diagram that shows yet another configuration for carrying out the present invention in principle;

FIG. 12 is a diagram that shows flows of phase signals from a transmitter to a receiver in DPSK using the configuration of FIG. 11.

DETAILED DESCRIPTION OF THE INVENTION

First Embodiment

Figure 2A:
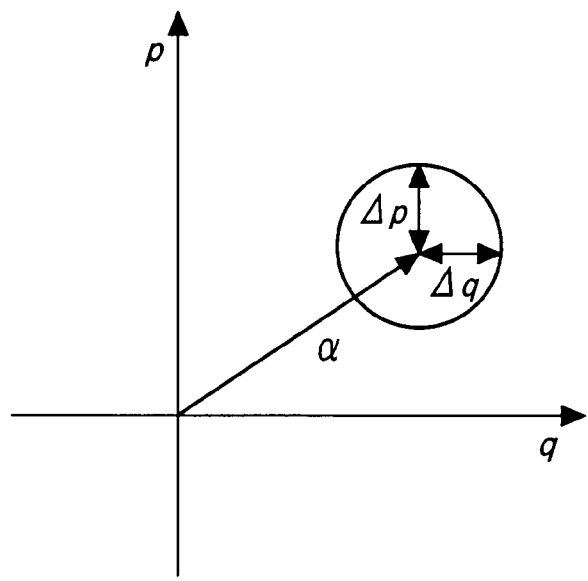
FIG. 2A is a diagram denoting that the fluctuation of a coherent state takes a circular shape in a phase space.

FIG. 1 is a block diagram that shows a configuration for carrying out the present invention in principle. Signal light that has been transmitted from a transmitter 100 is passed through an optical fiber 201 and reaches a receiver 300. Signals are superimposed on phase of output light from an antisqueezed light generator 110 by a phase modulator 120. This transmission scheme is called "phase-shift keying" (PSK). In the receiver 300, the signal light interfere, with the help of a 50:50 beam splitter 340, with local light. The local light which outputs from a local optical source 310 is completely phase-synchronized with the signal light. Next, the two output lights from the beam splitter are converted into electrical signals by photodetectors 351 and 352, respectively, and then the differential between the signals is output from an electric circuit 360 to obtain an output signal 3.

In this receiving method called "balanced homodyne detection", the local light itself and the signal light itself are canceled in the differential process and only the interfering terms of the local light and the signal light are left, that is, the phase of the signal light can be detected. Because the intensity of the detected light is proportional to amplitude of the local light and that of the signal light, if the intensity of the local light is sufficiently high, the phase of the signal light can be detected accurately. The intensity of the signal light needs not to be high.

The phase modulator 120 of the transmitter 100 phase-modulates antisqueezed light using a value synthesized at a signal synthesizer 140 with an output signal from a pseudo-random number generator 130 and an input signal. Input signal 1 consists of binary values of "0" and "1", which corresponds to "0" and "π" phases, respectively. The output from the pseudo-random number generator 130 is treated as multiple values, and corresponds to phase "φ" (0≦φ<2π). Phase codes in the phase modulator 120 become φ and φ+π, corresponding to the binary signals. Random φ means that the transmission basis is random.

A pseudo-random number generator 320 within the receiver 300 has the same function as that of the pseudo-random number generator 130 located inside the transmitter 100, and both pseudo-random number generators output mutually equal random numbers. In a phase modulator 330, the output light from the local optical source 310 is phase-modulated by φ according to the particular output of the pseudo-random number generator 320. The signal light and local light interfering at the beam splitter 340 always have the same offset phase φ, and a relative offset phase between the two lights is zero, leading to the result that phase "0" or "α" can be detected by balanced homodyne detection.

The pseudo-random number generators 130 and 320 are set so that they create the same random numbers in accordance with the same algorithm. This presupposes that a sender and a recipient share a secret seed key which initiates to generate pseudo-random numbers, using some method. This concept is the same as that used in a cryptosystem such as stream cipher. As will be described later herein, the present invention utilizes quantum-mechanical properties to further strengthen the security of the stream cipher or the like.

As mentioned above, the sender and recipient share the same pseudo-random numbers using the pseudo-random number generators, and respectively send and receive data which have been encrypted using the pseudo-random numbers. Eavesdroppers do not know the pseudo-random numbers that the sender and the recipient share. Even if an eavesdropper uses the receiver 300 to detect a particular signal, the eavesdropper has no choice but to haphazardly modulate the signal light at the phase modulator 330. For example, if 0 is selected as a phase modulation level of the phase modulator 330, the relative offset phase between the signal light and local light at the beam splitter 340 will become φ and correct detection will be impossible.

The present invention utilizes quantum-mechanical properties to give even greater security to communications based on the stream cipher or the like. Equation (1) describes an electric field of light using quantum-mechanical operators:

$$\hat{E} = u^*(x,t)\hat{a} + u(x,t)\hat{a}^\dagger, \quad (1)$$

$$[\hat{a}, \hat{a}^\dagger] = 1, \quad (2)$$

where $\hat{a}$ and $\hat{a}^\dagger$ are a creation and annihilation operators, respectively, and these operators satisfy the commutation relation of equation (2).

If equations (3) are defined to introduce quadrature coordinates, these $$\hat{a} = \hat{q} + i\hat{p}, \hat{a}^\dagger = \hat{q} - i\hat{p} \quad (3)$$

yield equation (4).

$$[\hat{q}, \hat{p}] = i/2 \quad (4)$$

We can get the uncertainty relation between $\hat{q}$ and $\hat{p}$ from equation (4) through a standard normal quantum-mechanical approach. When fluctuations of $\hat{q}$ and $\hat{p}$ are described by $\Delta q$ and $\Delta p$, respectively, the uncertainty relation is given in equation (5).

$$\Delta q \Delta p \geq 1/4 \quad (5)$$

As can be seen from equations (1) and (3), $\hat{q}$ and $\hat{p}$ are equivalent to normalized cosine and sine components of the electric field, and equation (5) indicates that the cosine component and sine component of the electric field cannot be accurately determined simultaneously and thus that a product of the respective fluctuations can never be zeroed.

It is known that output light from a laser which is operating sufficiently beyond a threshold level can be described well by a coherent state. The coherent state is defined using equation (6) below, and it is known that fluctuations are $\Delta q = \frac{1}{2}$ and $\Delta p = \frac{1}{2}$ in the coherent state.

$$\hat{a}|a\rangle = a|a\rangle \quad (6)$$

Figure 2B:
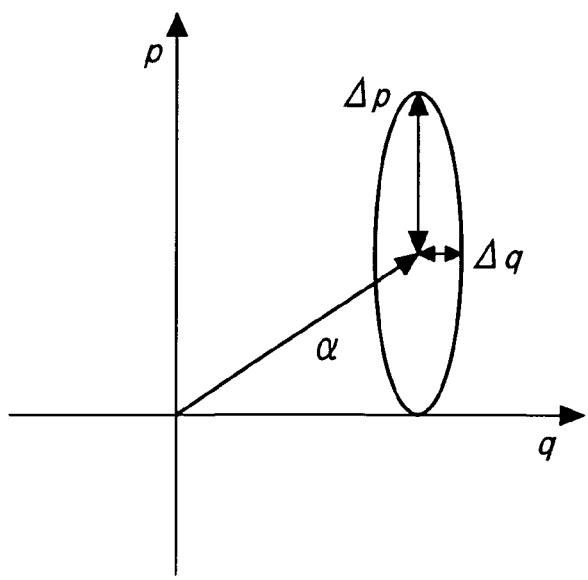
FIG. 2B is a diagram denoting that the fluctuation of a quadrature squeezed state takes an elliptic shape in a phase space.

In the coherent state, a minimum uncertainty relation is satisfied and $\Delta q = \Delta p$. The approximate range of the fluctuation takes a shape of a circle, as shown in FIG. 2A. The area of this circle is equal to that of a quantum-mechanical vacuum fluctuation, and the vacuum fluctuation has its center at the origin in a phase space. A coherent state is generated by displacing the vacuum fluctuation to an arbitrary position in a phase space of (q, p). When the circle representing a vacuum fluctuation (a coherent-state fluctuation) is changed into an ellipse, the state is referred to as a squeezed state (see FIG. 2B). In FIG. 2B, $\Delta q$ is reduced and $\Delta p$ is expanded, compared with those of the vacuum fluctuation. Expanding one fluctuation component is called "antisqueezing", which plays an essential role in the present invention.

Consider a process of transmitting a binary signal using an antisqueezed state. If two values of the binary signal are assigned to phases "0" and "π", the antisqueezed state for expressing the two signal values can be represented as in FIG. 3A. Balanced homodyne detection in the receiver 300 is equivalent to projecting the antisqueezed state on any axis within the (q, p) plane according to a particular phase of the local light. Projecting the antisqueezed state on q-axis, for example, produces the result shown in FIG. 3B. When the projection axis is perpendicular to the antisqueezed direction, a signal-detecting process is not affected by the antisqueezed fluctuation. Because the pseudo-random number generator 130 inside the transmitter 100 and the pseudo-random number generator 320 within the receiver 300 generate the same random numbers, the relative offset phase between the signal light and local light at the beam splitter 340 can always be zeroed. This makes it possible for the legitimate recipient to always project signals on the q-axis and hence to receive signals at a sufficiently low error rate.

In contrast to the above, an eavesdropper who does not retain random-number information has no choice but to project signals on haphazard directions, and for example, the eavesdropper fixes the projection axis on the q-axis. Because signal light includes a regularity-free offset phase φ based on the pseudo-random numbers, the fluctuation of the signal light at a particular moment in the receiver will be as shown in FIG. 3C, for example, and signal detection probability distribution projected on q-axis is shown in FIG. 3D. As is obvious from FIG. 3D, the signal detection probability distribution of binary codes will overlap and the error rate of the signals received will correspondingly increase. This increase in the error rate at the eavesdropper side will be more significant as antisqueezing is strengthened. The error rate at the legitimate recipient's side, however, will not increase.

When the probability distribution projected on q-axis is P(q), the error rate at the receiver is given by equation (7).

$$E_r = \int_{-\infty}^{0} P(q)dq, \quad (7)$$

where P(q) can be written by a Wigner function W(q, p) that is a quasi-probability distribution function, and is given by Equation (8).

$$P(q) = \int_{-\infty}^{\infty} W(q, p)dp \quad (8)$$

The error rate of the receiver, therefore, can be written using double integration of the Wigner function, as shown in equation (9).

$$P(q) = \int_{-\infty}^{0} \int_{-\infty}^{\infty} W(q, p) dp dq \qquad (9)$$

Squeezed state is well described with a squeezing parameter "r". One quadrature of a vacuum fluctuation (coherent-state fluctuation) is reduced by a factor of "$e^{-r}$" and another quadrature is expanded by a factor of "$e^{r}$" Equation (10) represents the Wigner function of the squeezed state whose average amplitude exists at ($q_0$, $p_0$) and which is squeezed in q-axis and antisqueezing in p-axis.

$$W(q, p) = \frac{\pi}{2} \exp[-2e^{r}(q - q_0)^2 - 2e^{-r}(p - p_0)^2] \qquad (10)$$

Figure 3A:
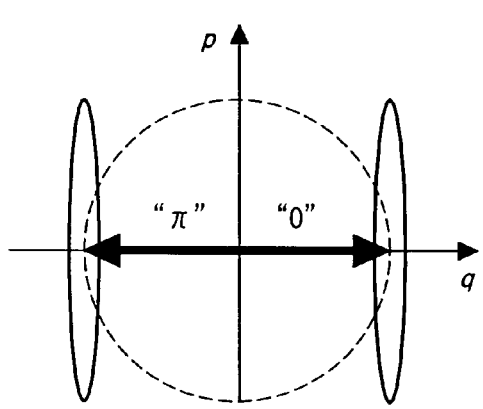
FIG. 3A is a diagram that shows two squeezed states with "0" and "π" phases, corresponding to binary signal values.
Figure 3C:
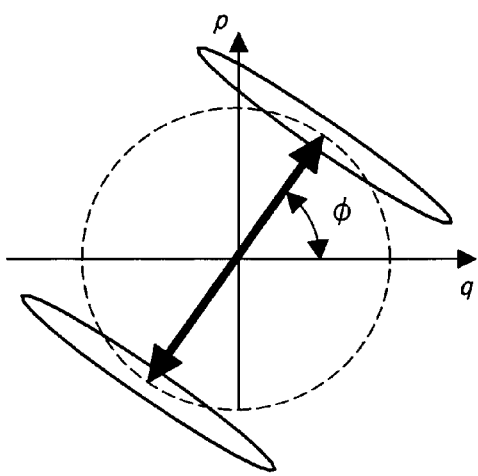
FIG. 3C shows an example in which the two squeezed states corresponding to the binary signal values of FIG. 3A are rotated in the phase space by a random phase φ.
Figure 3B:
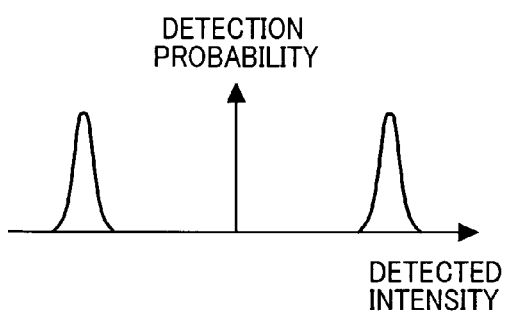
FIG. 3B shows a probability distribution obtained when the binary signal in FIG. 3A is projected on q-axis.
Figure 3D:
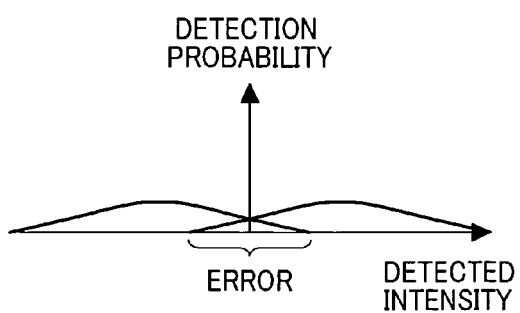
FIG. 3D shows a probability distribution obtained when the signal in FIG. 3C is projected on the q-axis.

Equation (10) is a mathematical expression of the schematic ellipses of FIGS. 2B and 3A that figure squeezed states. The Wigner function of the squeezed state including offset phase φ is obtained from equation (10) through a coordinate transformation. When the integral of equation (9) is executed using the Wigner function, equation (11) is obtained.

$$P(q) = \frac{1}{2} \left\{ 1 - \text{erf}\left[ \sqrt{\frac{2}{e^{2r}\sin^2\alpha + e^{-2r}\cos^2\alpha}} (q_0 \cos\phi - p_0 \sin\phi) \right] \right\}, \qquad (11)$$

where "erf(y)" can be written as equation (12).

$$\text{erf}(y) = \frac{2}{\sqrt{\pi}} \int_0^y \exp(-t^2) dt \qquad (12)$$

Figure 4:
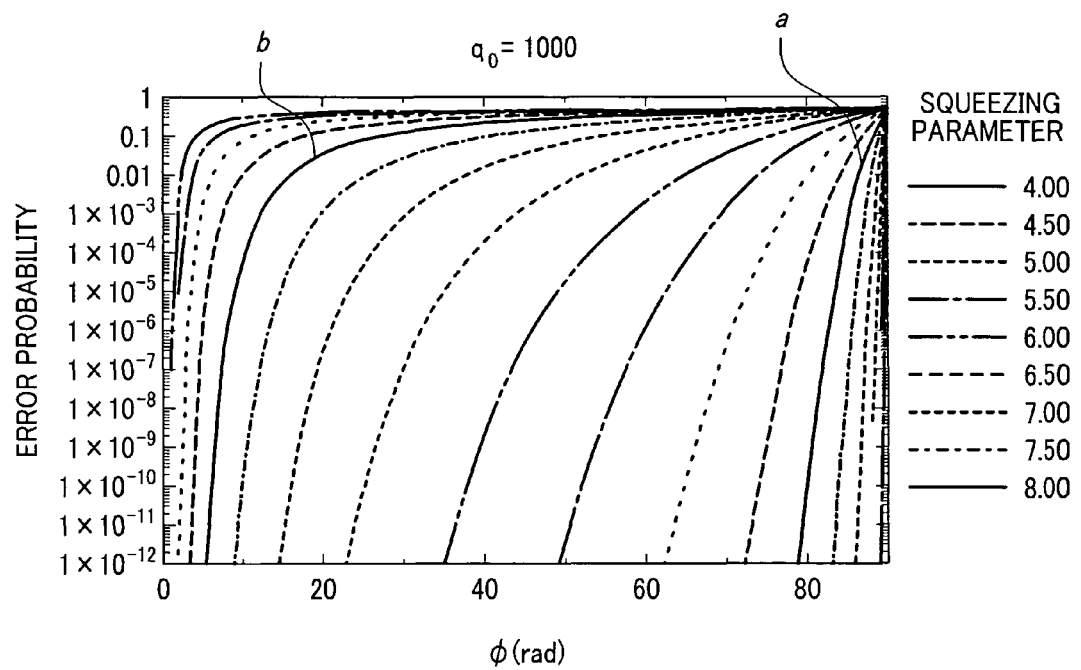
FIG. 4 is a diagram showing an example in which the bit error rate obtained from the probability distributions in FIGS. 3B and 3D is plotted as a function of the random phase φ for each of different squeezing parameters "r" for the state of radius 1000 in the phase space (equivalent to a state that the number of photon is $10^6$ at the center point of the fluctuation)

FIG. 4 shows the error rate at an eavesdropping receiver with respect to the offset phase φ for each squeezing parameter "r" when the photon number at a central point of the fluctuation is $10^6$ and $p_0=0$. In FIG. 4, "a" denotes a line that the squeezing parameter "r" is 4.0, and "b" denotes a line that the squeezing parameter "r" is 8.0. Changes in the squeezing parameter "r" between the two values are each expressed by a specific linear pattern, as shown at the right side of the figure. Changes in the squeezing parameter "r" when it is smaller than 4.0 and when it is greater than 8.0 are each plotted as the same linear pattern by changing the squeezing parameter "r" similarly. However, plots for the squeezing parameter "r" when it is smaller than 4.0 overlap in a narrow range, and plots for the squeezing parameter "r" when it is greater than 8.0 also overlap in a narrow range.

The photon number of $10^6$ per signal is almost equivalent to the intensity used in ordinary optical communications. For example, optical intensity at a bit rate of 10 Gbps and a wavelength of 1.55 μm is 1.3 mW for this photon number. In a coherent state whose squeezing parameter "r" is 0, error rate is $10^{-9}$ or less in substantially the entire region, except when φ=90°, and, therefore, the error rate cannot be plotted except for φ=90°. In other words, eavesdroppers can almost eavesdrop on signals consisting of the macroscopic photon number of $10^6$, even if they do not know the offset phase φ. When squeezing parameter "r" is more than 0, the error rate gradually increases, except in vicinity of φ=0.

The legitimate recipient retains information on the offset phase φ and can always perform measurements in the condition of φ=0 in FIG. 4. An actual system, however, brings errors in φ. If an error margin is 10°, an error rate of $10^{-10}$ or less is guaranteed for the legitimate recipient in the squeezing level of r<7.5. However, eavesdroppers suffer an extremely high error rate in almost whole regions except for φ<10°, and will be unable to eavesdrop on meaningful information unless the eavesdropper retain information on the offset phase φ.

As is probably understandable from the schematic diagrams of FIGS. 4 and 3C, the error rate in eavesdropping increases with squeezing parameter "r" or antisqueezing strength. An optimum value of "r" depends on the photon number, and it increases with the photon number. In other words, no matter how great the photon number is, the optimum "r" exists. This is important, and in the present invention, quantum-mechanical cryptographic communication is possible even at macroscopic optical intensity.

Figure 5:
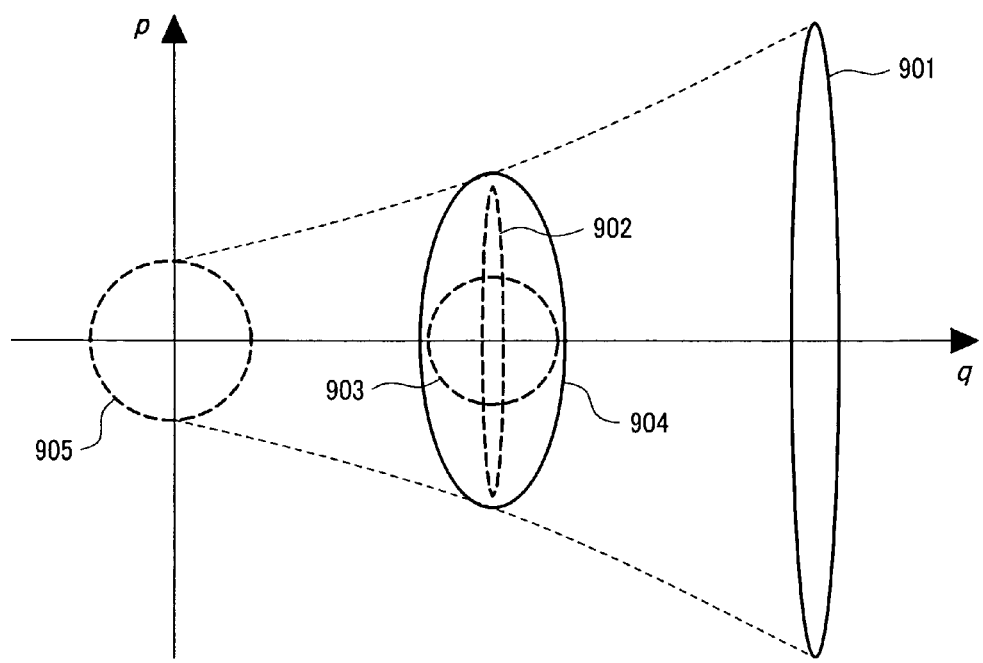
FIG. 5 schematically shows a change in quadrature squeezed state due to loss.

In general, optical loss or other factors easily change quantum states into states different from their original ones. Loss can be expressed with a beam splitter model, and a loss of 75%, for example, means that an original quantum state is reduced in amplitude by factor $0.251^{1/2}$, and the vacuum fluctuation multiplied by $0.75^{1/2}$ in amplitude is superimposed. FIG. 5 schematically shows a loss process of a squeezed state. The fluctuation of an original squeezed state 901 becomes the reduced fluctuation 902 through a beam splitter of 25% transmittance, in which the original squeezed state has been 50% scaled down in both q-axis and p-axis directions. Also, a 75% vacuum fluctuation 903 is added through the beam splitter, and the total fluctuation becomes roughly the form shown as 904. Reference number 905 denotes a vacuum fluctuation.

The squeezed state of the minimum uncertainty relation is a quantum-mechanical state called a pure state, whereas such a state that two states are mixed as denoted by 904 is called a mixed state, and an area of the fluctuation in this latter case is not in the minimum uncertainty relation. When two quantum states are mixed, their fluctuations are summed and the larger fluctuation predominates over the other. For the fluctuation 904, the 75% vacuum fluctuation 903 predominates on the minor axis and the 25% fluctuation 902 of the squeezed state predominates on the major axis. The fluctuation 904 is the result. The reduced fluctuation on the minor axis of a squeezed state is easily pulled back to the vacuum fluctuation level, whereas the expanded fluctuation on the major axis is hardly affected by the vacuum fluctuation.

It is important in the present invention that the expanded fluctuation makes it difficult to eavesdrop, and the reduced fluctuation component is not important. Unlike the squeezed component, original properties of the antisqueezed component will remain even through loss, although the expanded fluctuation as discussed above will be reduced according to the particular loss. For this reason, the general properties that the quantum state is fragile and is difficult to be used do not hold true in a method of using quantum states, according to the present invention.

The above conclusion based on qualitative discussions can also be accurately derived in a theoretical way. In this case, a quantum state is expressed using a Wigner function. We set an initial quantum state of light at W(q, p), a vacuum state at $W_0$(q, p), a state transmitted through a beam splitter at W'(q, p), and a transmittance at the beam splitter at η. Those quantities have a relation described by equation (13).

$$W'(q, p) = \int_{-\infty}^{\infty} \int_{-\infty}^{\infty} W \begin{bmatrix} \eta^{1/2} q - (1-\eta)^{1/2} q_2, \\ \eta^{1/2} p - (1-\eta)^{1/2} p_2 \end{bmatrix} \times \\ W_0 \begin{bmatrix} (1-\eta)^{1/2} q + \eta^{1/2} q_2, (1-\eta)^{1/2} p + \\ \eta^{1/2} p_2 \end{bmatrix} dq_2 dp_2 \quad (13)$$

(For example: "Leonhardt, Measuring the Quantum State of Light," pp. 80, Cambridge University Press 1997). Equation (13) means that quadrature variables "q" and "p" of the initial quantum state "W" and the vacuum state $W_0$ are coordinate-transformed through the beam splitter, and that all possible states corresponding to loss are integrated because the loss components are never measured. When the initial quadratures are ($q_0$, $p_0$) in average and the quantum state is squeezed in the q-direction and antisqueezed in the p-direction, the Wigner function is given by above-described equation (10). Substituting it into equation (13) and calculating it yields equation (14).

$$W'(q, p) = \\ \frac{2}{\pi} \sqrt{\frac{1}{[e^{2r}(1-\eta)+\eta] \cdot [e^{-2r}(1-\eta)+\eta]}} \times \exp\left[\frac{-2e^{2r}(q-\eta^{1/2} q_0)^2}{e^{2r}(1-\eta)+\eta}\right] \cdot \\ \exp\left[\frac{-2e^{-2r}(p-\eta^{1/2} p_0)^2}{e^{-2r}(1-\eta)+\eta}\right] \quad (14)$$

If the transmittance η at the beam splitter and the reflectance (1-η) are of the same order of magnitude or differ by one digit at most and when $e^r \gg 1$, equation (14) is approximated, and the exponential part of it is written by equation (15).

$$W'(q, p) \propto \exp\left[-2\frac{1}{(1-\eta)}(q-n^{1/2} q_0)^2\right] \cdot \exp\left[-2\frac{e^{-2r}}{\eta}(p-\eta^{1/2} p_0)^2\right] \quad (15)$$

In this case, a spread of the Wigner function is, in the q-direction, equal to $(1-\eta)^{1/2}$ times as great as a vacuum fluctuation, and in the p-direction, equal to $e^r \eta^{1/2}$. In other words, the parameter "$e^r$" indicative of squeezing and anti-squeezing is lost in the minor-axis direction of the fluctuation, whereas "$e^r$" remains in the major-axis direction. These indicate that, as described in the qualitative discussions, the properties of the fluctuation in the major-axis direction do not easily break even if part of the light is lost, and that the present invention intrinsically using the major-axis direction of the fluctuation has been proved to be resistant against loss.

Figure 6:
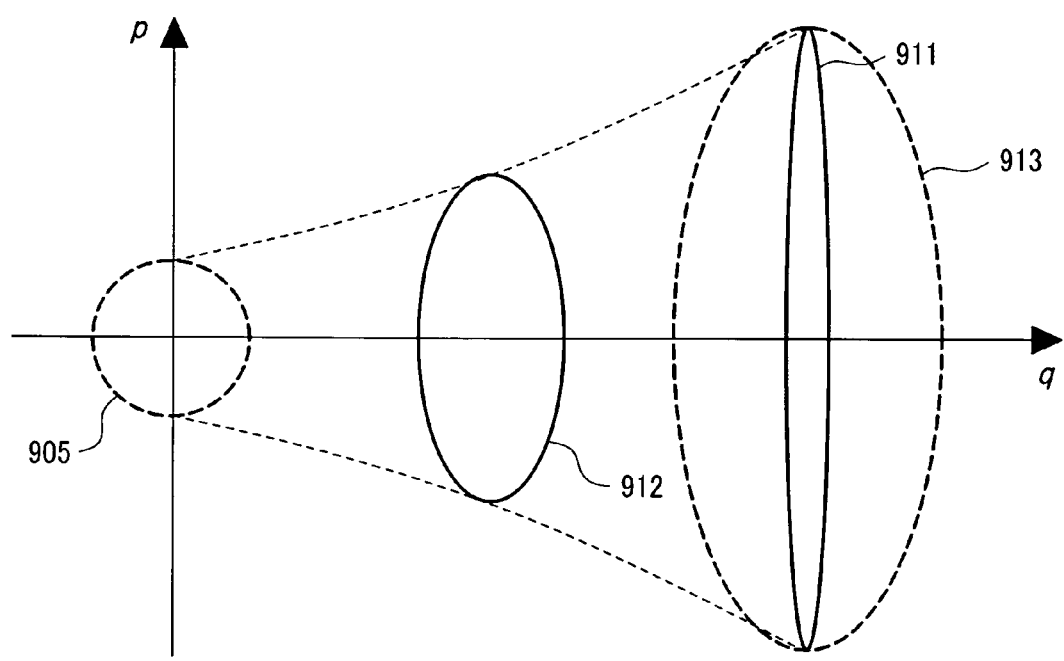
FIG. 6 schematically shows a change in quadrature squeezed state due to loss and amplification.

The present invention is a method durable against the inflow of vacuum fluctuation, and a similar consideration will indicate that this method can also withstand optical amplification. FIG. 6 schematically shows the way that the present invention actually has these capabilities. Initial squeezed state 911 is transformed into a state 912 through loss in the transmission path. As described with respect to FIG. 5, this state is a mixed state having an inflow of vacuum fluctuation. Because any quantum state converges on a vacuum state for complete loss, if transmission loss is too significant, the antisqueezed fluctuation will not be any more sufficiently large. If the light is amplified at a stage where the fluctuation in the major-axis direction is still great enough, the fluctuation 912 is equally amplified and amplified spontaneous emission is added to generate fluctuation 913. For an optical fiber with a loss of −0.2 dB/km, for example, the optical intensity is reduced to 1/10 through 50-km transmission and this reduction is equivalent to a beam splitter of η=0.1 transmittance. The condition under which the antisqueezed fluctuation sustains sufficiently large is equivalent to the condition under which the approximation for equation (15) holds, that is, $e^{-2r} \ll \eta$ and $e^r \gg e^{1.15}$. The condition of $e^{-2r} \ll \eta$ or $e^r \gg e^{1.15}$ is easily attainable, which indicates that the present invention can use an optical amplifier to construct a long-haul transmission system. In the configuration of FIG. 1, this optical amplifier is located either at a posterior stage of the phase modulator 120, at a middle section of the transmission path 201, or at an anterior stage of the beam splitter 340, thereby to amplify optical signals.

As described above in regard to FIG. 4, the optimum value of the squeezing parameter "r" changes according to the particular optical intensity, and when a long-haul transmission system is considered, "r" depends on transmission loss, too. The resolution required for the offset phase φ, determined by the particular output of the pseudo-random number generator, depends on the value of "r". To get high bit-error-rate for eavesdropping, there must be enough number of sender bases in which the error rate can be regarded as ½, that is, sender bases near φ=90° in FIG. 4. In other words, the resolution Δφ must be sufficiently small, compared with an angle which subtends the antisqueezed fluctuation at the origin. Requirement of resolution Δφ can be expressed as $\Delta\phi \ll \Delta p/q_0 = e^r/q_0$ in terms of rad (radians). When $q_0$ is 1000 (equivalent to a state of $10^6$ photons being present centrally in the fluctuation), inequality Δ≪8.5° must be satisfied for r=5, and Δφ≪3.1° for r=4.

The essence of the present invention is due to the fact that, for example, if the phase space of (q, p) is divided into two binary regions, namely, a "0" region and a "1" region, an eavesdropper unknowing of the offset phases will have no way to measure a boundary region of the "0" and "1" accurately. Therefore, merely selecting an offset phase φ value that satisfies 0≦φ<π, not 0≦φ<2π, significantly increases the error rate at the eavesdropper, compared with the error rate at the legitimate recipient. The error rates in FIG. 4 indicate this situation. Of course, the binary signal is preferably encrypted using the output value from the pseudo-random number generator, as in ordinary stream cipher, and the case of 0≦φ<2π is equivalent to that. In other words, considering an indeterministic quantum-mechanical factor not including any deterministic classical-mechanical factors is equivalent to a case in which the offset phase is selected so that 0≦φ<π holds. A case considering all matters regardless of a quantum-mechanical factor or classical-mechanical factors is equivalent to a case in which the offset phase is selected so that 0≦φ<2π holds. If the error rate at the eavesdropper is plotted in the case of 0≦φ<2π as in FIG. 4, the error rate will be ½ in all regions.

Various methods are usable to generate antisqueezed light (squeezed light) important for implementing the present invention. A convenient method is, for example, the method described in "C. R. Doerr, I. Lyubomirsky, G. Lenz, J. Paye, H. A. Haus, and M. Shirasaki, QELS' 93 Technical Digest pp. 281.) or the method described in the specification and drawings that accompany Japanese Patent Application No. 2005-002071 relating to proposals by the inventor of the present application.

Figure 7A:
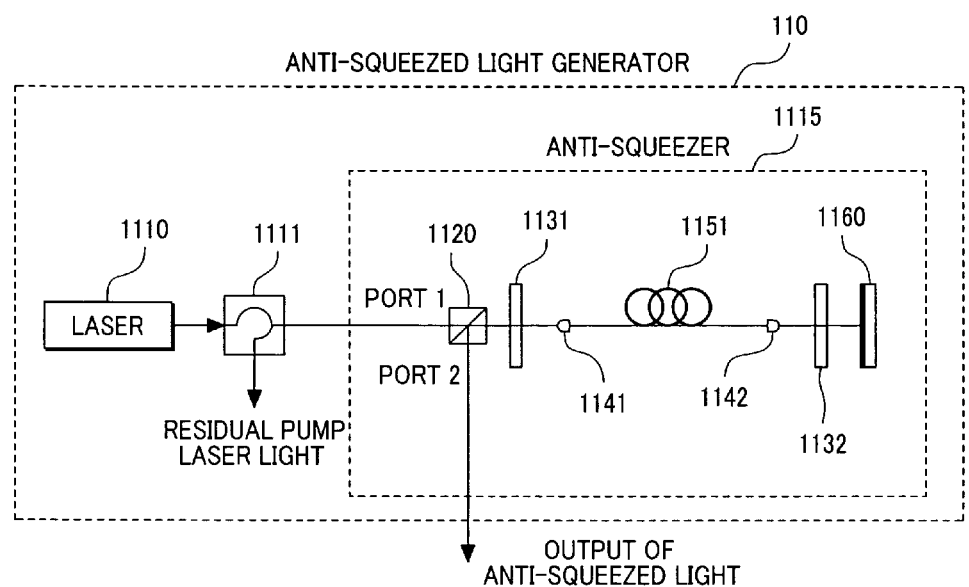
FIG. 7A is a block diagram showing an example of a configuration for generating antisqueezed light.

An antisqueezed light generator 110 that apply those methods is shown in FIG. 7A. Output light from a laser 1110, which is in a coherent-state, is passed through a circulator (or isolator) 1111 and introduced into an antisqueezer 1115. In the antisqueezer 1115, the light first enters a polarizing beam splitter 1120 in p-polarization. After being passed through the polarizing beam splitter 1120, the light is input to a polarization-maintaining fiber 1151 through a half-wave plate 1131 and a collimator lens 1141. Polarization of the input light is adjusted by the half-wave plate 1131 so that two orthogonal components polarized to two optical-axis directions of the polarization-maintaining fiber 1151 will be essentially equal. The light, after passing a collimator lens 1142 and a λ/4 waveplate 1132 and reaching a mirror 1160, reflects and follows an optical path reverse to the above. On this return path, a polarizing direction alternates with that of the above original path, with the result that the two polarization components within the polarization-maintaining fiber 1151 reciprocate to follow equal optical path lengths. The two polarization components that have returned to the polarizing beam splitter 1120 interfere, and most of the light is output to a port 1, but part of the light is output to a port 2. This latter output is antisqueezed light (squeezed light). Pump laser light that has returned to the port 1 is processed by the circulator (isolator) 1111 so as not to return to the laser 1110.

Figure 7B:
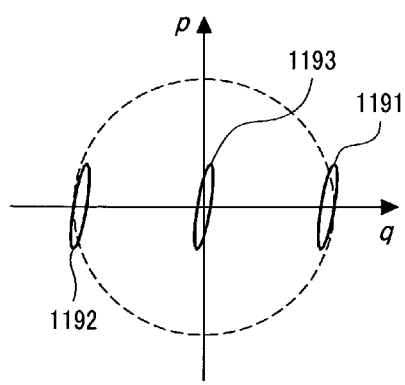
FIG. 7B is a diagram that illustrates principles of generating the antisqueezed light by using the optical Kerr effect of an optical fiber.

The process of creating the antisqueezed light (squeezed light) is schematically shown in FIG. 7B. The effect that a refractive index linearly increases with the optical intensity is referred to as the optical Kerr effect, by which the light phase-modulates itself in proportion to the optical intensity. When we consider a coherent state, the phase modulation on a fluctuation circle by the optical Kerr effect differs between the inside and outside in a phase space, with the result that, as shown as 1191 in FIG. 7B, the circle is made elliptic (i.e., the quantum state is squeezed). The polarization-maintaining fiber 1151 is a medium for the optical Kerr effect, and generates two elliptic fluctuations using the two optical axes. The polarizing beam splitter 1120 causes two elliptic fluctuation components to interfere with each other when the two components return back. This is equivalent to summing up the fluctuations shown as 1191 and 1192 in FIG. 7B, and light having a fluctuation 1193 is output from the port 2 of the polarizing beam splitter 1120. If fluctuations 1191 and 1192 are equally displaced from the origin of the phase space, fluctuation 1193 becomes a squeezed vacuum fluctuation with a center at the origin of the phase space.

Figure 7C:
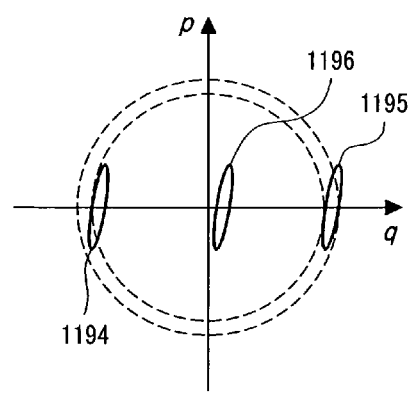
FIG. 7C is a diagram that illustrates principles of generating displaced antisqueezed light by using the optical Kerr effect of the optical fiber.

The present invention uses displaced antisqueezed light whose fluctuation is not present at the origin. When the two polarization components within the polarization-maintaining fiber 1151 is slightly put out of balance by the adjustment of the half-wave plate 1131, displaced squeezed light 1194 and 1195 are generated, and finally displaced squeezed light 1196 is obtained, as shown in FIG. 7C. That is to say, arbitrary optical intensity can be obtained by adjusting the half-wave plate 1131. The strength of antisqueezing can be adjusted according to the particular intensity of the input laser light and particular length of the polarization-maintaining fiber 1151.

Figure 8:
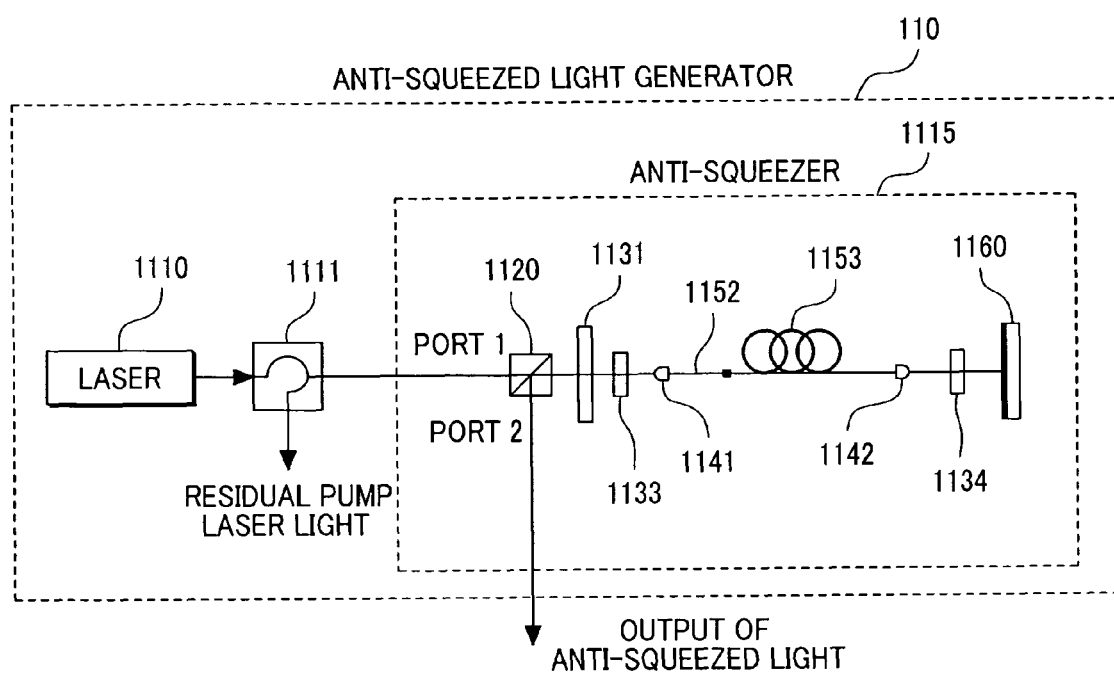
FIG. 8 is a block diagram showing another example of a configuration for generating antisqueezed light.

Although the polarization-maintaining fiber is used as the medium for the optical Kerr effect in FIG. 7A, arbitrary-displaced squeezed light can likewise be generated using a single-mode fiber that does not maintain polarization, as shown in FIG. 8. Single-mode fibers with various dispersions are commercially available and make an optimal pulse-propagation condition possible.

In FIG. 8, the polarization-maintaining fiber 1151 in FIG. 7 is replaced by a single-mode fiber 1153. However, a polarization-maintaining fiber 1152 with a length of, for example, about 10 cm (this value depends on pulse width of the input light) is disposed at the input side and a time delay is provided between two polarization components within the fiber 1152 so as to avoid overlapping of two components. A half-wave plate 1131 functions to ensure that the two components polarized to two optical axes of the polarization-maintaining fiber 1152 are substantially equal to each other in intensity, similar to the configuration of FIG. 7. Faraday rotators 1133 and 1134 are elements for interchanging the polarization between outward and inward transmission paths, and both rotators rotate by 45 degrees for one-way transmission. The total angle rotated by two Faraday rotators is 180 or 0 degrees for two-way transmission. Therefore, a large portion of the input light is returned to a port 1 and a very small portion is output from a port 2 as squeezed light. If the two polarized light components within the fibers 1152 and 1153 have completely equal intensity, the output light from the port 2 becomes a squeezed vacuum. Displaced squeezed light can be obtained by, as described in FIG. 7C, adjusting the half-wave plate 1131 to slightly put the two polarized light components out of balance. The strength of antisqueezing can be adjusted according to particular intensity of the input laser light and particular length of the single-mode fiber 1153.

As described above, the arrangement shown in FIG. 7 or FIG. 8 makes it possible to generate a state of arbitrary antisqueezing strength, with an arbitrary amount of displacement. FIGS. 7 and 8 show principles, and as seen in the specification and drawings that accompany Japanese Patent Application No. 2005-002071, other configurations are also possible.

In the configuration of FIG. 1, the local optical source 310 synchronized with signal light at a phase level is installed inside the receiver 300. Various methods of synchronizing signal light and local light at the phase level are proposed and studied (e.g., refer to "Coherent Optical Communications", edited by Sadakuni Shimada, pp. 25 to 26, pp. 49 to 50, Corona Publishing Co., 1988). Not only phase modulation relating to signals but also a random phase φ equivalent to the modulation of sender bases is added in the present invention. Phase synchronization between signal light and local light, therefore, needs to be performed after canceling the offset phase φ by adding the phase φ to the local light as well.

Another usable alternative method is by using a portion of the output light from the light source within the transmitter, not by installing a local light source inside the receiver 310. In the arrangement of FIGS. 7 and 8, it is possible to actually take out a portion of the output light from the laser 1110, but pump laser light that is output from the circulator 1111 can be used instead. In this case, the local light is transmitted using the same transmission path 201 as that of the signal light. There is a method usable for avoid overlapping between local light and signal light by giving a time delay between them, or there is a method usable to transmit signal light and local light with orthogonal polarizations without a time delay (the method described in the specification and drawings that accompany Japanese Patent Application No. 2004-183253 relating to proposals by the inventor of this application is the latter method). In the latter method, because the signal light and the local light are transmitted through the same optical fiber under exactly the same environment, their phase relationship is completely saved through the transmission.

Second Embodiment

A method that uses PSK to code signals and uses local light to receive the signal has been described in the first embodiment. In the method of the first embodiment, local light must be provided in some way, and this requirement causes technical difficulty. It is possible to use signal light itself as local light, and FIG. 9 shows the method.

Figure 9:
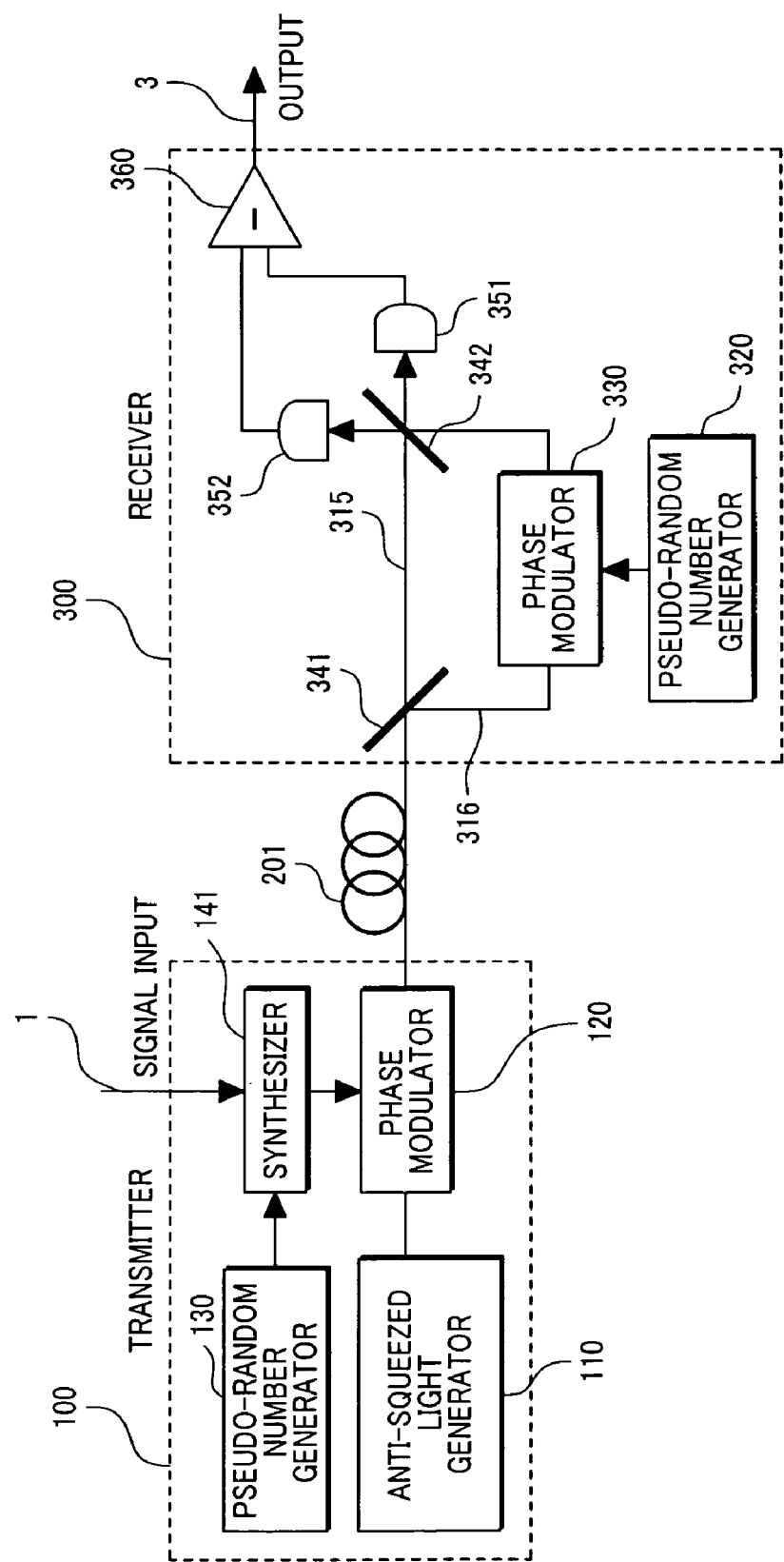
FIG. 9 is a block diagram that shows another configuration for carrying out the present invention in principle.

A configuration of a transmitter 100 in FIG. 9 is the same as the configuration of FIG. 1, except that the signal synthesizer 141 described later herein differs from the signal synthesizer 140 in circuit composition. In a receiver 300 that has received a signal transmitted via an optical fiber 201, there is an asymmetric two-path interferometer where optical path length of a delay line 316 is adjusted so that successive slots of signal light will interfere at a beam splitter 342. In some sense, a next slot of the signal light can be said to work as local light, and in some sense, the signal is transmitted as a phase difference between any two successive slots. The latter scheme is referred to as DPSK (differential-phase-shift keying). In this differential-phase scheme, the transmitter or the receiver needs to have a function that converts the signal into a form appropriate for a particular differential type, or vice versa. FIG. 10 shows an example in which the code converter is assigned to the signal synthesizer 141 within the transmitter 100. Signals and pseudo-random numbers are expressed in units of radian. Slot numbers are expressed as "t", the pseudo-random numbers at the transmitter as $\phi$ (t), the signal as s(t), and the signal to be sent as [$\phi$ (t)+s(t)]. Because signals are transmitted with DPSK, a phase modulator 120 is driven, according to equation (16).

$$\theta = \sum_{t=0}^{t} [\phi(t) + s(t)] \qquad (16)$$

Here, a phase θ is adjusted by adding 2nπ (n: an integer) such that 0≤θ<2π.

The receiver 300 uses a two-path interferometer constructed by beam splitters 341 and 342. Light on one optical path 316 is phase-modulated using a phase modulator 330, based on an output of a pseudo-random-number generator 320, and it interferes with the other light transmitted along the optical path 315 with one slot difference. When the phase modulator 330 is not driven, the received signal becomes [$\phi$(t)+s(t)]. If the output of the pseudo-random-number generator 320 is equal to that of an transmitter-side pseudo-random-number generator 130, $\phi$ (t) can be canceled by driving the phase modulator 330 and thus the signal "s(t)" can be obtained.

Because transmission loss generally occurs in a phase modulator, a splitting ratio of the beam splitter 341 is determined so that the optical intensities on the two paths become equal at the 50:50 beam splitter 342. Because the optical-path difference of the two-path interferometer needs to be sufficiently stable at a phase level, the optical paths 315 and 316 are precisely temperature-controlled, or the path difference between paths 315 and 316 is feedback-controlled, or the like.

Security on a transmission path can be considered as similar to that of the first embodiment, and a legitimate recipient can reconstruct the signal "s(t)" without being affected by antisqueezing. Eavesdroppers unknowing of the transmitting random phase $\phi$ (t) are to perform measurements that include $\phi$ (t), and are significantly affected by antisqueezing.

Although the phase modulator 330 inside the receiver of FIG. 9 is installed on one optical path of the two-path interferometer, the phase modulator 330 can be located at an anterior stage of the interferometer instead, as shown in FIG. 11. In this case, the splitting ratio of the beam splitter 341 can be set to 50:50. Because the position of the phase modulator inside the receiver is changed, a manner of coding signals with pseudo-random numbers inside the transmitter is also changed. The manner that the signal "s(t)" is arithmetically integrated with respect to "t" in considering differential detection is the same as that of FIG. 9. However, because the pseudo-random number component is canceled out at the anterior stage of the two-path interferometer without being subjected to differential detection, pseudo-random number $\phi$ (t) is not integrated with respect to "t" and the phase superimposed by the phase modulator 120 can be expressed using equation (17).

$$\theta = \sum_{t=0}^{t} s(t) + \phi(t) \qquad (17)$$

A flow of signals transmitted and received using this method is shown in FIG. 12.

The fact that secure communications using PSK and DPSK can be realized according to the present invention has been described above. However, because the essence of the invention is to make eavesdropping difficult by using the antisqueezed fluctuation, an applicable signal-coding is not limited to PSK or DPSK and any other coding can be adopted.

Figure 13:
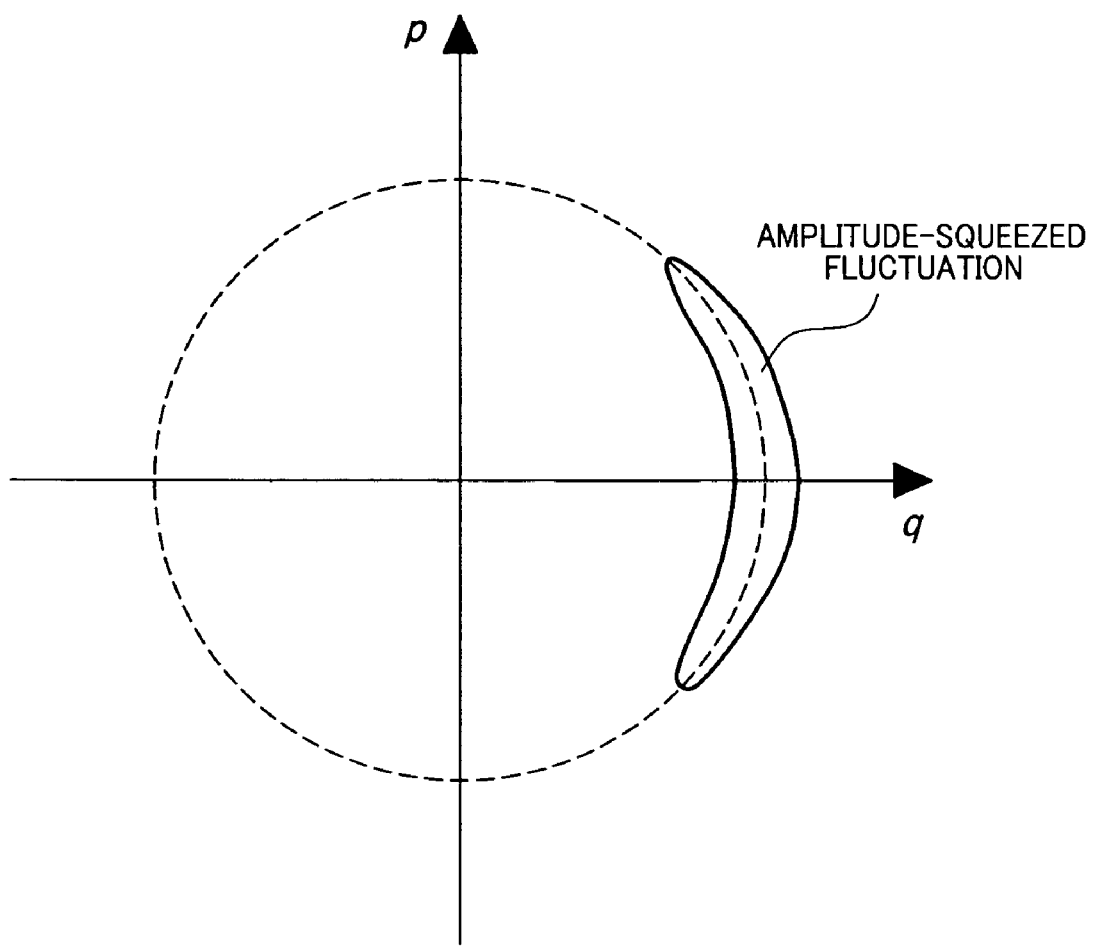
FIG. 13 schematically shows the fluctuation of an amplitude-squeezed state.

In addition, while embodiments have been described in connection with the functions for quadrature squeezed states, because the essence of the invention is to achieve secure communications by using the antisqueezed fluctuation, the invention may also be realized by other kinds of states, such as an amplitude squeezed state (antisqueezed for phase) shown in FIG. 13.

The present invention provides a method that enables secure communications by utilizing quantum-mechanical properties, even for macroscopic optical intensity. That is to say, the invention provides a secure communications' method usable under realistic conditions, and this method is highly usable.

What is claimed is:

1. An optical transmitting/receiving system, the system comprising:
    an optical transmitter including a first phase modulator and a first light source inclusive of a laser light source and of an antisqueezer which expands a fluctuation of laser light from the laser light source in an antisqueezing direction that is orthogonal to amplitude of the light, in a phase space, and perpendicular to a superimposing direction of a signal;
    an optical receiver including two photodetectors, a beam splitter, a second light source phase-synchronized with a signal light from the optical transmitter, and a second phase modulator; and
    an optical transmission path connecting the optical transmitter and the optical receiver; wherein
    the system uses the light antisqueezed by the antisqueezer as a carrier;
    in the optical receiver, after either the signal light or a local light from the second light source is phase-modulated by the second phase modulator in terms of the characteristic phases $\phi$ of individual signals transmitted from the optical transmitter, the signal light and the local light are homodyne-detected through interfering, so as to detect the signal light projecting to a projection axis perpendicular to the antisqueezing direction of the fluctuation in the phase space.

2. The optical transmitting/receiving system according to claim 1, wherein the antisqueezer antisqueezes the light in a phase.

3. The optical transmitting/receiving system according to claim 1, wherein, in order to ensure matching between the phase $\phi$ in $\phi$ and $\phi$+π modulated by the first phase modulator within the optical transmitter and the phase $\phi$ modulated by the second phase modulator within the optical receiver, a random number that becomes a seed of the phase $\phi$ is shared between the optical transmitter and the optical receiver.

4. The optical transmitting/receiving system according to claim 3, wherein the optical transmitter and the optical receiver respectively use an independent pseudo-random number generator of the same algorithm to obtain a series of phases $\phi$ common between the optical transmitter and the optical receiver, from the seed random number shared between both.

5. The optical transmitting/receiving system according to claim 1, wherein the antisqueezer enhances antisqueezing according to the amplitude of the signal light.

6. The optical transmitting/receiving system according to claim 1, wherein the optical transmitter further has an optical amplifier at a stage which follows the first phase modulator.

7. An optical receiver which is used in an optical transmitting/receiving system including an optical transmitter having an antisqueezer which antisqueezes a fluctuation of a light from a first optical source in an antisqueezing direction that is orthogonal to amplitude of the light, in a phase space, and a first phase modulator, and using the light antisqueezed by the antisqueezer as a carrier through an optical transmission path, the optical receiver comprising:

two photodetectors;

a beam splitter;

a second optical source phase-synchronized with a signal light transmitted from the optical transmitter; and a second phase modulator;

wherein a superimposing direction of a signal in the optical transmitter is perpendicular to the antisqueezing direction; and wherein, after either the signal light or a local light from the second optical source is phase-modulated by the second phase modulator in terms of the characteristic phases $\phi$ of individual signals transmitted from the optical transmitter, the signal light and the local light are homodyne-detected through interfering, so as to detect the signal light projecting to a projection axis perpendicular to the antisqueezing direction of the fluctuation in the phase space.

8. An optical transmitting/receiving system, the system comprising:

an optical transmitter including a first light source and an antisqueezer which expands a fluctuation of light from the first light source in an antisqueezing direction that is orthogonal to amplitude of the light, in a phase space, and a first phase modulator;

an optical receiver including a second light source generating a local light phase-synchronized with a signal light from the optical transmitter, and a second phase modulator; and an optical transmission path connecting the optical transmitter and the optical receiver;

wherein a superimposing direction of a signal in the optical transmitter is perpendicular to the antisqueezing direction, wherein the system uses the light antisqueezed by the antisqueezer as a carrier;

wherein in the optical transmitter, the signal light is phase-modulated in terms of phase $\phi$ and $\phi+\pi$ with respect to a binary signal, the signal light is antisqueezed by the antisqueezer so as to expand the fluctuation of the signal light in the orthogonal direction to amplitude, and the phase $\phi$ is determined by a random number or a pseudo-random number;

wherein the signal light phase-modulated in terms of phase $\phi$ and $\phi+\pi$, and antisqueezed is transmitted with the optical transmission path; and wherein in the optical receiver, after either the signal light or the local light from the second light source is phase-modulated by the second phase modulator in terms of the characteristic phases $\phi$ of individual signals transmitted from the optical transmitter, a homodyne-detection is executed by interfering the signal light and the local light, so as to detect the signal light projecting to a projection axis perpendicular to the antisqueezing direction of the fluctuation in the phase space.

* * * * *